United States Patent

Schick et al.

[11] Patent Number: 5,862,026
[45] Date of Patent: *Jan. 19, 1999

[54] CAM MECHANISM TO CLAMP MAGNETIC DISK AGAINST CARTRIDGE SHELL

[75] Inventors: Brian R. Schick, Eden; Allen T. Bracken, Layton; Edward L. Rich; Wayne A. Sumner, both of Ogden, all of Utah

[73] Assignee: Iomega Corporation, Roy, Utah

[ * ] Notice: The term of this patent shall not extend beyond the expiration date of Pat. No. 5,650,899.

[21] Appl. No.: 834,188

[22] Filed: Apr. 15, 1997

Related U.S. Application Data

[63] Continuation of Ser. No. 550,818, Oct. 31, 1995, Pat. No. 5,650,899, which is a continuation-in-part of Ser. No. 477,764, Jun. 7, 1995, abandoned.

[51] Int. Cl.[6] .................................................. G11B 23/03
[52] U.S. Cl. ........................................... 360/133; 369/291
[58] Field of Search ............................. 360/133; 369/270, 369/289, 290, 291

[56] References Cited

U.S. PATENT DOCUMENTS

| | | | |
|---|---|---|---|
| 4,320,430 | 3/1982 | Vogt ......................................... | 360/133 |
| 4,400,748 | 8/1983 | Bauck et al. ............................... | 360/99 |
| 4,532,564 | 7/1985 | Larson et al. .............................. | 360/97 |
| 4,559,575 | 12/1985 | Noto et al. ............................... | 360/133 |
| 4,608,617 | 8/1986 | Oishi et al. ............................... | 360/133 |
| 4,688,127 | 8/1987 | Oishi et al. .............................. | 360/132 |
| 4,864,452 | 9/1989 | Thompson et al. ...................... | 360/133 |
| 4,879,621 | 11/1989 | Chamberlin et al. .................... | 360/133 |
| 4,901,173 | 2/1990 | Jones et al. .......................... | 360/99.04 |
| 4,943,880 | 7/1990 | Muehlhausen et al. ................. | 360/133 |
| 5,247,511 | 9/1993 | Koike et al. ............................. | 369/263 |
| 5,444,586 | 8/1995 | Iftikar et al. ......................... | 360/99.12 |
| 5,535,081 | 7/1996 | Nelson et al. ........................... | 360/133 |
| 5,650,899 | 7/1997 | Schick et al. ........................... | 360/133 |

FOREIGN PATENT DOCUMENTS

| | | |
|---|---|---|
| 369 651 | 5/1990 | European Pat. Off. . |
| 59-8173 | 1/1984 | Japan . |
| 62-298980 | 12/1987 | Japan . |
| 1-019572 | 1/1989 | Japan . |
| WO 89/08312 | 9/1989 | WIPO . |

*Primary Examiner*—William R. Korzuch
*Attorney, Agent, or Firm*—Woodcock Washburn Kurtz Mackiewicz & Norris LLP

[57] ABSTRACT

A cartridge for a magnetic disk drive has a clamping mechanism which is actuated as the door to the cartridge is closed when the cartridge is removed from the drive. The door covers the opening through which the cartridge is accessed by read/write heads. When the cartridge is removed from the drive, the mechanism of the present invention clamps the recording disk against the cartridge shell to prevent rattle, which might otherwise damage the recording disk.

15 Claims, 9 Drawing Sheets

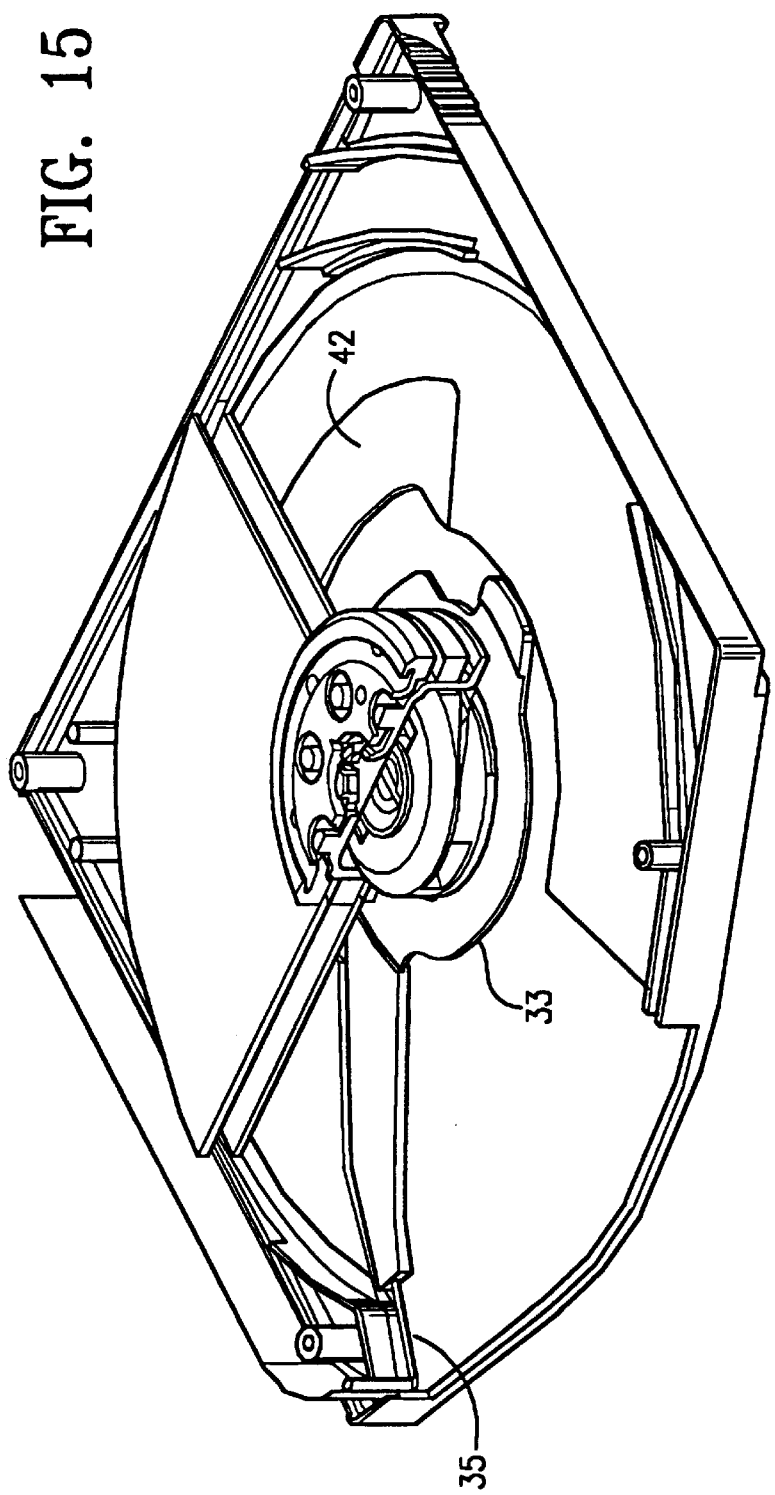
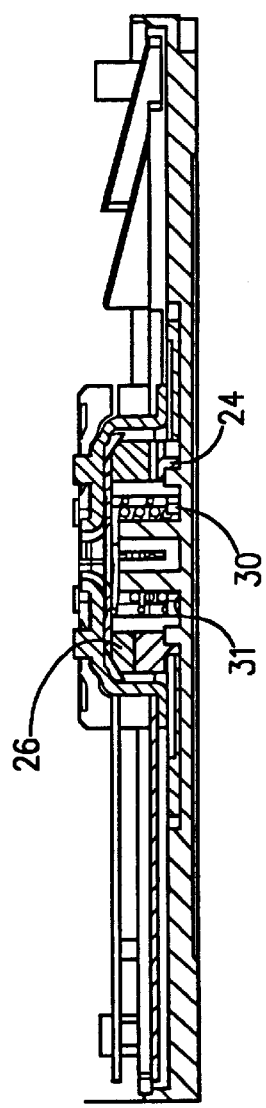

5,862,026

CAM MECHANISM TO CLAMP MAGNETIC DISK AGAINST CARTRIDGE SHELL

RELATED APPLICATION

This is a continuation of U.S. application Ser. No. 08/550,818, filed Oct. 31, 1995, now U.S. Pat. No. 5,650,899, titled "Cam Mechanism to Clamp Magnetic Disk Against Cartridge Shell," which is a continuation-in-part of application Ser. No. 08/477,764, filed Jun. 7, 1995, now abandoned.

BACKGROUND OF THE INVENTION

This invention relates to data storage drives and more particularly, to a removable cartridge for magnetic disk drives.

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452-Thompson et al is an example of such a drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748-Bauck, et al and related patents to the common assignee show such drives using Bernoulli stabilized flexible disks. U.S. Pat. No. 4,901,173-Jones et al and related patents to the common assignee, show improvements which relate to so-called "half height" drives.

The cartridges for these drives have a door which closes the cartridge when it is removed from the drive. This prevents debris from contaminating the magnetic recording medium when the cartridge is not in the drive. When the cartridge is inserted into the drive, this door slides to an open position to provide access for the magnetic recording heads to engage the recording medium.

When the cartridge is removed from the drive, it is often subject to rough handling. During handling, physical contact of the disk with the shell may damage the disk, particularly if the disk and cartridge shell are subject to excessive "rattling".

It is an object of the present invention to provide a device which clamps the disk to the cartridge shell when the cartridge is removed from the drive to prevent rattling of the cartridge.

SUMMARY OF THE INVENTION

In accordance with the present invention, a clamping mechanism in a data storage cartridge is actuated when the cartridge is removed from the drive. The mechanism restrains the recording medium to prevent rattling.

The clamping mechanism is driven by the motion of the sliding door. When the door is closed (cartridge out of drive) the mechanism expands and restrains the media from rattling inside the cartridge during handling. When the door is opened (cartridge inserted in the drive) the mechanism contracts such that it is free of the hub and the media is free to rotate.

The mechanism is attached to the sliding door by means of an actuating wire which provides a spring coupling to allow for mechanism over travel at both ends of the sliding stroke as well as compliance to account for relative changes in the distance between the mechanism and sliding door attachment point as the door travels through its stroke. In a preferred embodiment, a member rotatable about the axis of the recording medium has an arm connected to the door and attaches the sliding door to the mechanism. A wire in an opening in the terminal end of the arm telescopes into and out of the opening as the door travels through its stroke.

The clamping mechanism includes a rotating cam which rotates in the same axis as the media, a translating cam follower, a return spring, and an actuating wire, or arm, which connects the rotating cam to the motion of the sliding cartridge door. The mechanism is attached to the cartridge top shell half. It is situated in the cavity formed inside the media hub. The mechanism has two states; locked and unlocked. In the locked state the translating cam follower applies a force against the media hub effectively trapping the hub against the cartridge bottom shell. This force is sufficient to prevent the media from rattling against the cartridge shell halves when out of the drive. In the unlocked state the translating cam does not contact the hub thus allowing the media to spin freely.

The foregoing and other objects, features and advantages of the invention will be better understood from the following more detailed description and appended claims.

SHORT DESCRIPTION OF THE DRAWINGS

FIG. 15 is a broken-away perspective view of the cartridge of the preferred embodiment with the door in the open position;

FIG. 16 is a cross-section of the cartridge of FIG. 15; and

DESCRIPTION OF THE PREFERRED EMBODIMENT

Figure 2:
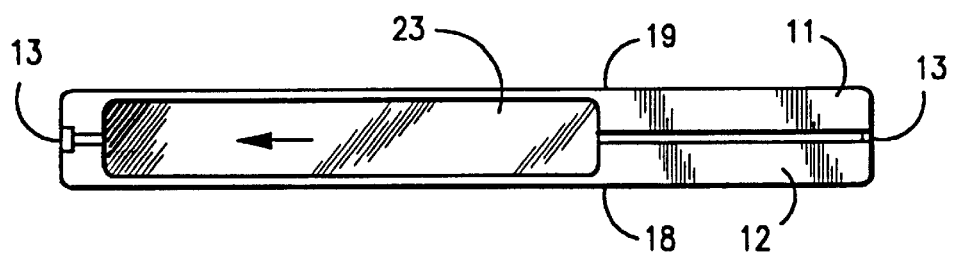
FIG. 2 is a front view of the cartridge.
Figure 1:
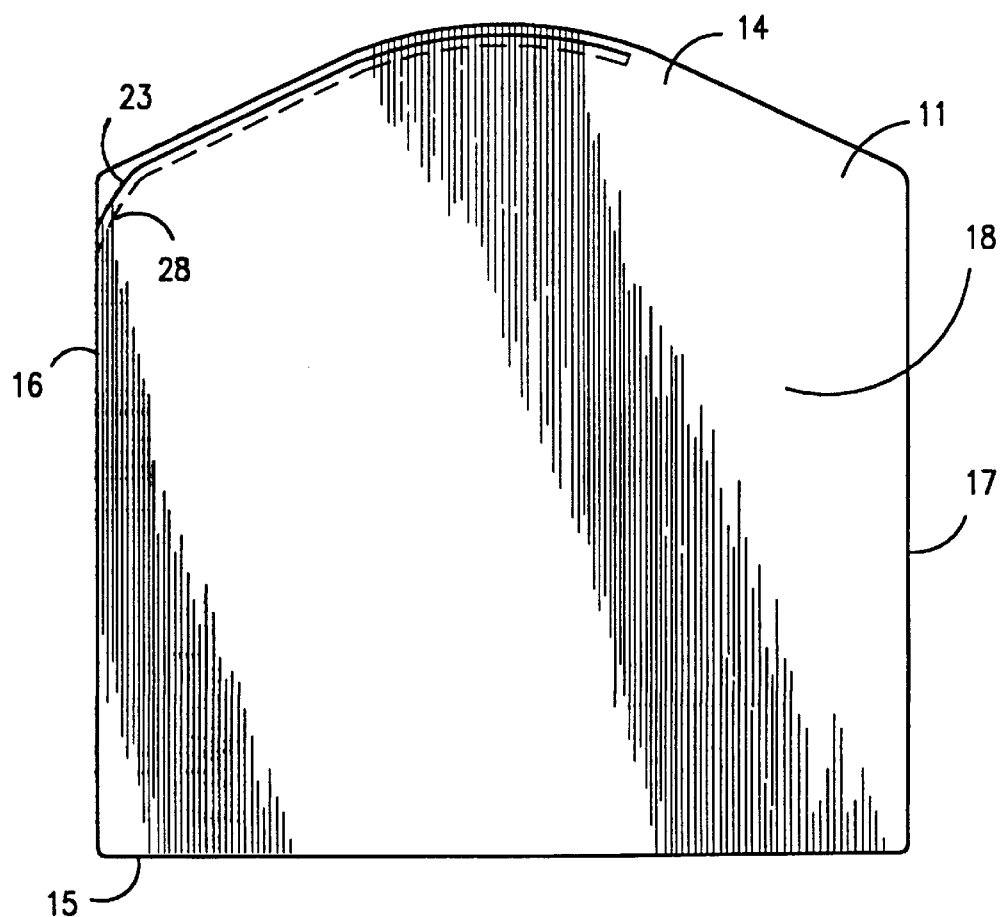
FIG. 1 shows a top view of the cartridge of the present invention.

FIGS. 1–4 show a cartridge having two half shells 11 and 12 joined together at 13. The cartridge has a front 14, a back 15 and two sides 16 and 17 between substantially flat, planar surfaces 18 and 19. An opening 20 in the front of the cartridge provides access by the read/write heads to the recording disks 22, 22A. A flexible door 23 covers the opening when the cartridge is removed from the drive.

Figure 6:
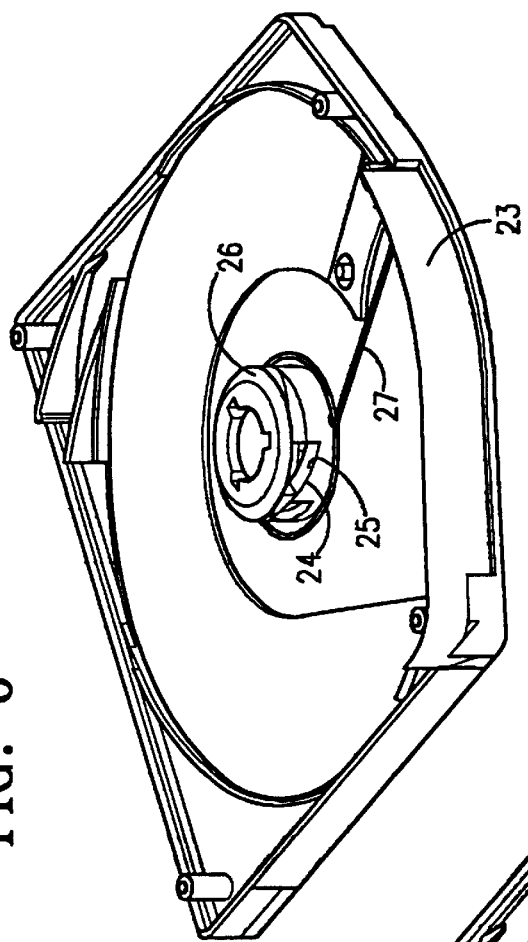
FIG. 6 is broken-away isometric view of the cartridge with the door closed.
Figure 5:
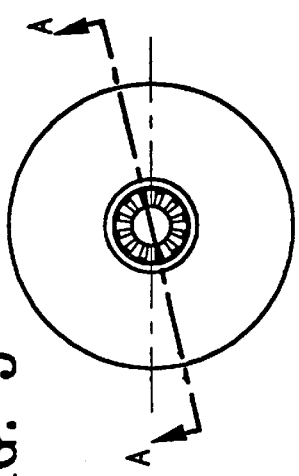
FIG. 5 is a top view of the spindle motor.
Figure 6A:
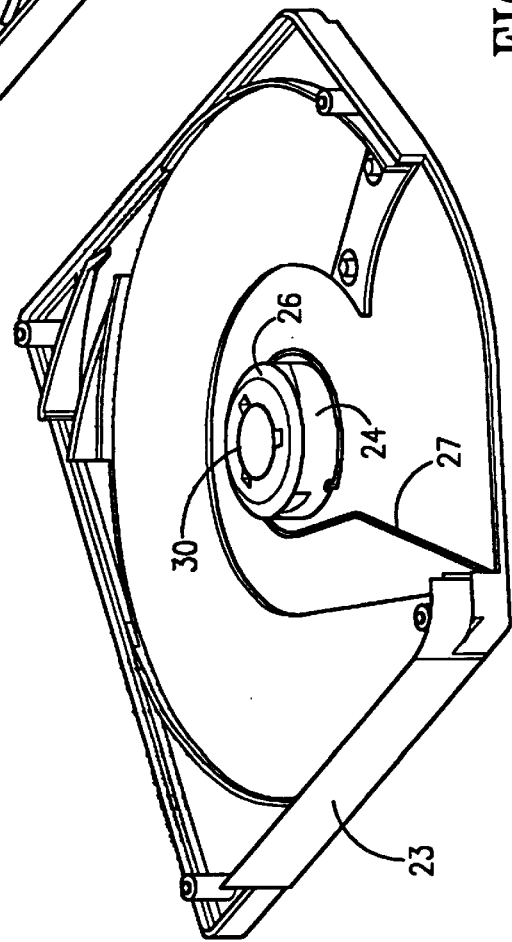
FIG. 6A is a view similar to FIG. 6 with the door open.
Figure 7:
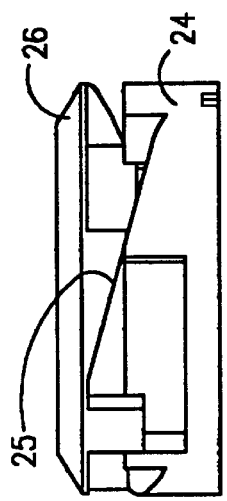
FIG. 7 is a side view of the cam/cam follower assembly with the cartridge door open.
Figure 8:
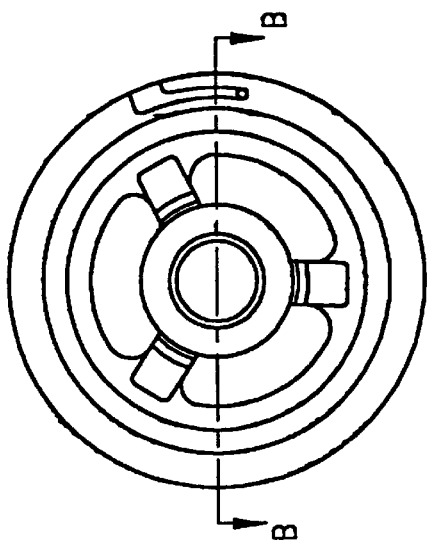
FIG. 8 is a top view of FIG. 7.
Figure 8A:
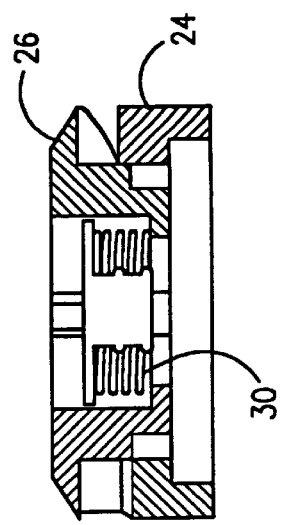
FIG. 8A is a section on the line A—A of FIG. 8.
Figure 9:
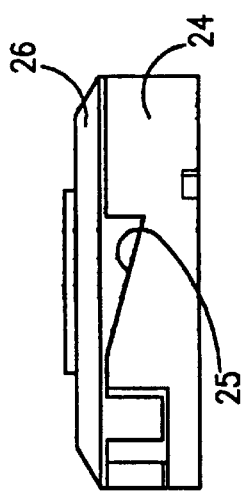
FIG. 9 is a side view of the cam/cam follower assembly with the cartridge door in the open position.
Figure 10:
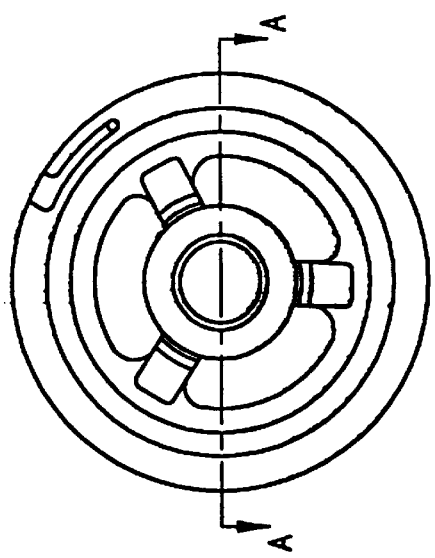
FIG. 10 is a top view of the assembly of FIG. 9.
Figure 10B:
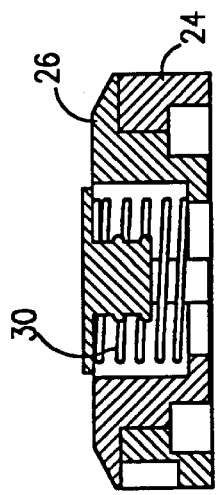
FIG. 10B is a section on the line B—B of FIG. 10.
Figure 12:
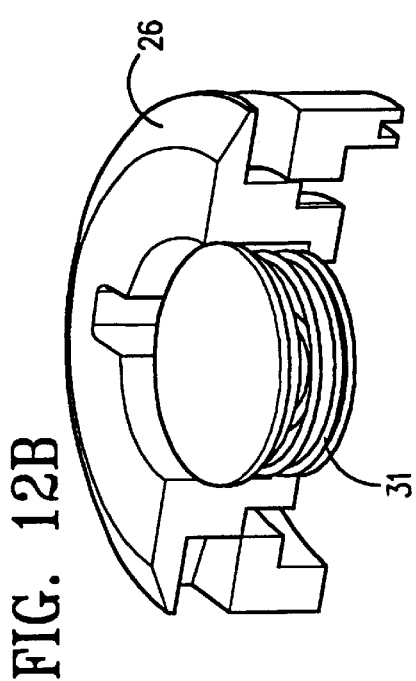
FIG. 12 is an isometric view of the cam/cam follower assembly with the cartridge door in the open position.

In accordance with the present invention, a clamping mechanism is actuated as the door 23 is opened and closed. This mechanism includes a rotating cam 24 which is rotatable on the same axis as the disks 22, 22A. The cam 24 has a surface 25 which extends axially as a function of the circumference of the cam. Translating cam follower 26 (FIG. 6) is moved axially by the surface 25 as the cam 24 rotates. This axial movement clamps the disk 22 against the bottom half of the shell 11 in the position shown in FIG. 4.

Figure 3:
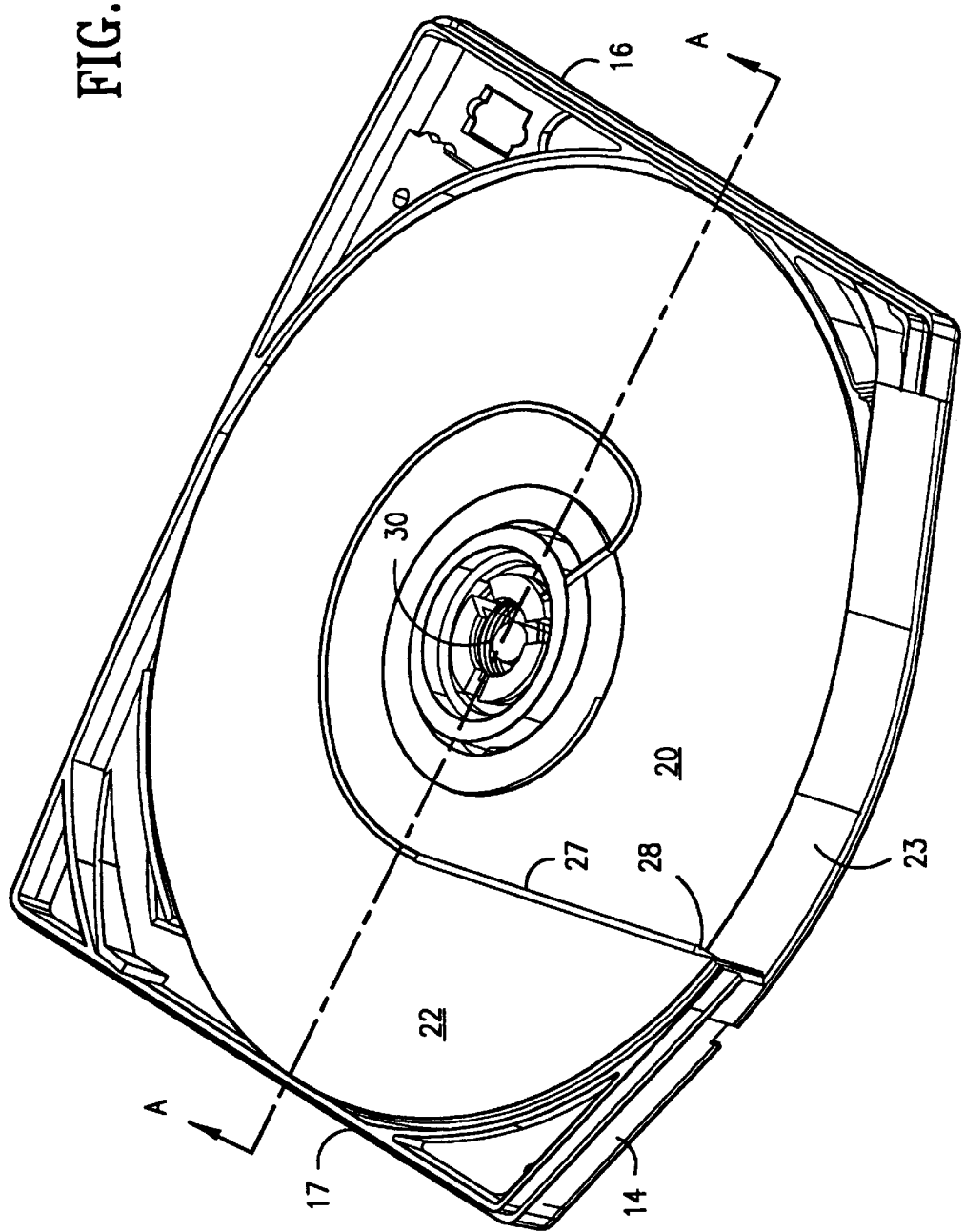
FIG. 3 is an isometric view of the cartridge with the top shell removed.

As shown in FIG. 3, the rotating cam 24 is connected to the door 23 by the actuating wire 27. Actuating wire 27 provides a spring coupling which allows for over-travel at both ends of the stroke of the door 23. Spring 27 also provides for relative changes in the distance between the cam 24 and the point 28 at which the actuating wire 27 is attached to the door 23. This distance varies as the door travels through its stroke.

Figure 4:
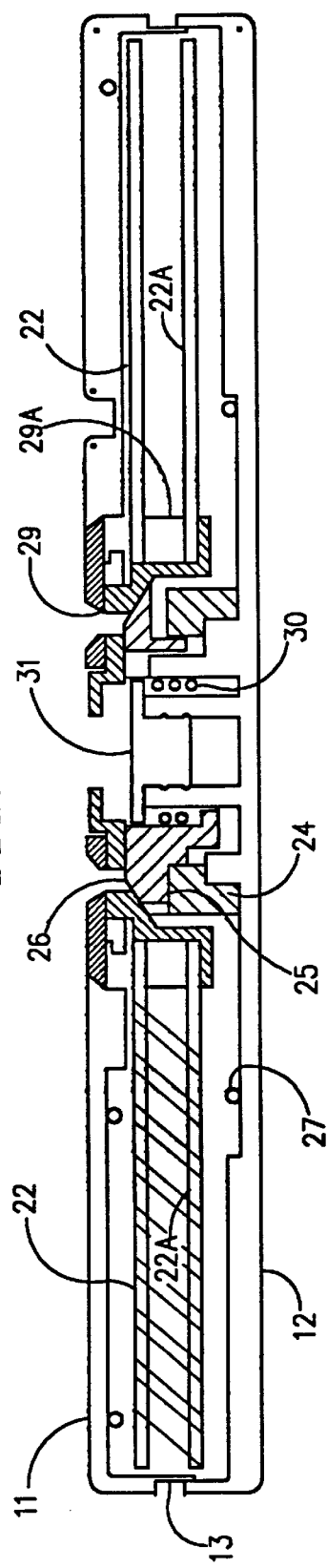
FIG. 4 is a section on the lines A—A of FIG. 3.
Figure 5A:
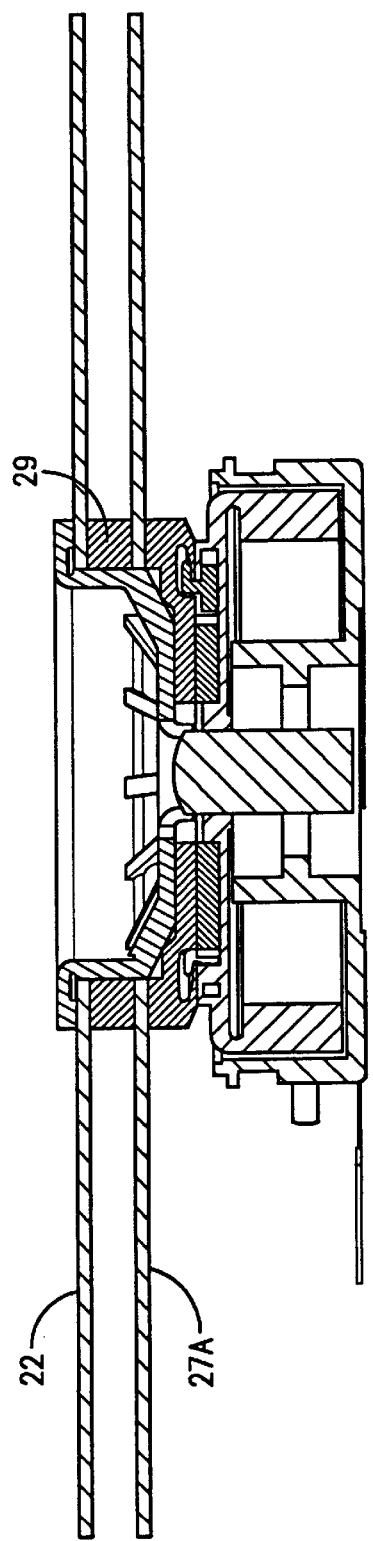
FIG. 5A is a section on the line A—A of FIG. 5 showing the cartridge in place on the motor.

Recording disks 22 and 22A are mounted on a hub 29 (FIGS. 4 and 5A). A spacer 29A separates disks 22 and 22A. The cam follower 26 applies an axial force to the hub 29 to clamp the recording disk 22 against the bottom wall 11 of the shell.

Figure 11:
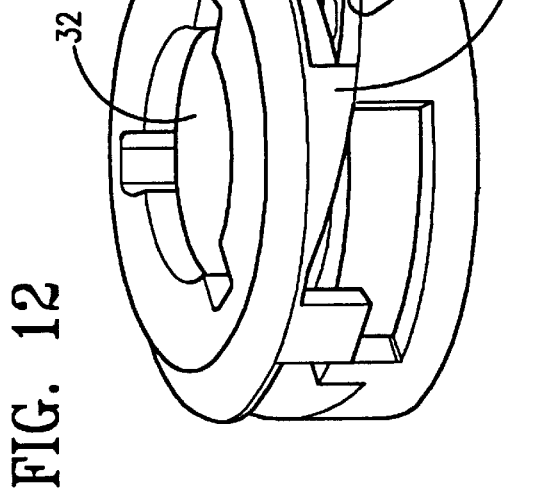
FIG. 11 is an isometric view of the cam/cam follower assembly with the artridge in the open position.
Figure 11A:
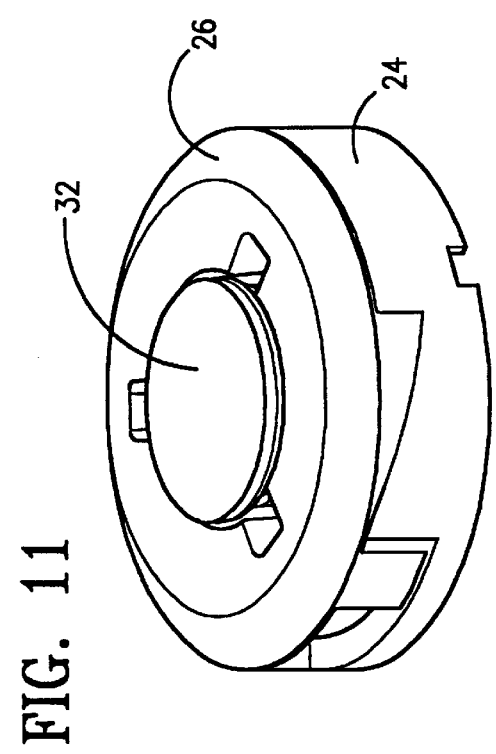
FIG. 11A is an isometric view of the section on the line A—A of FIG. 8.
Figure 12B:
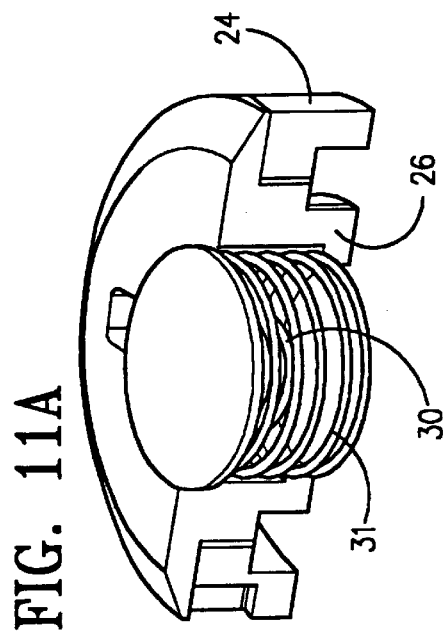
FIG. 12B is an isometric view of the section on the line B—B in FIG. 10.
Figure 13:
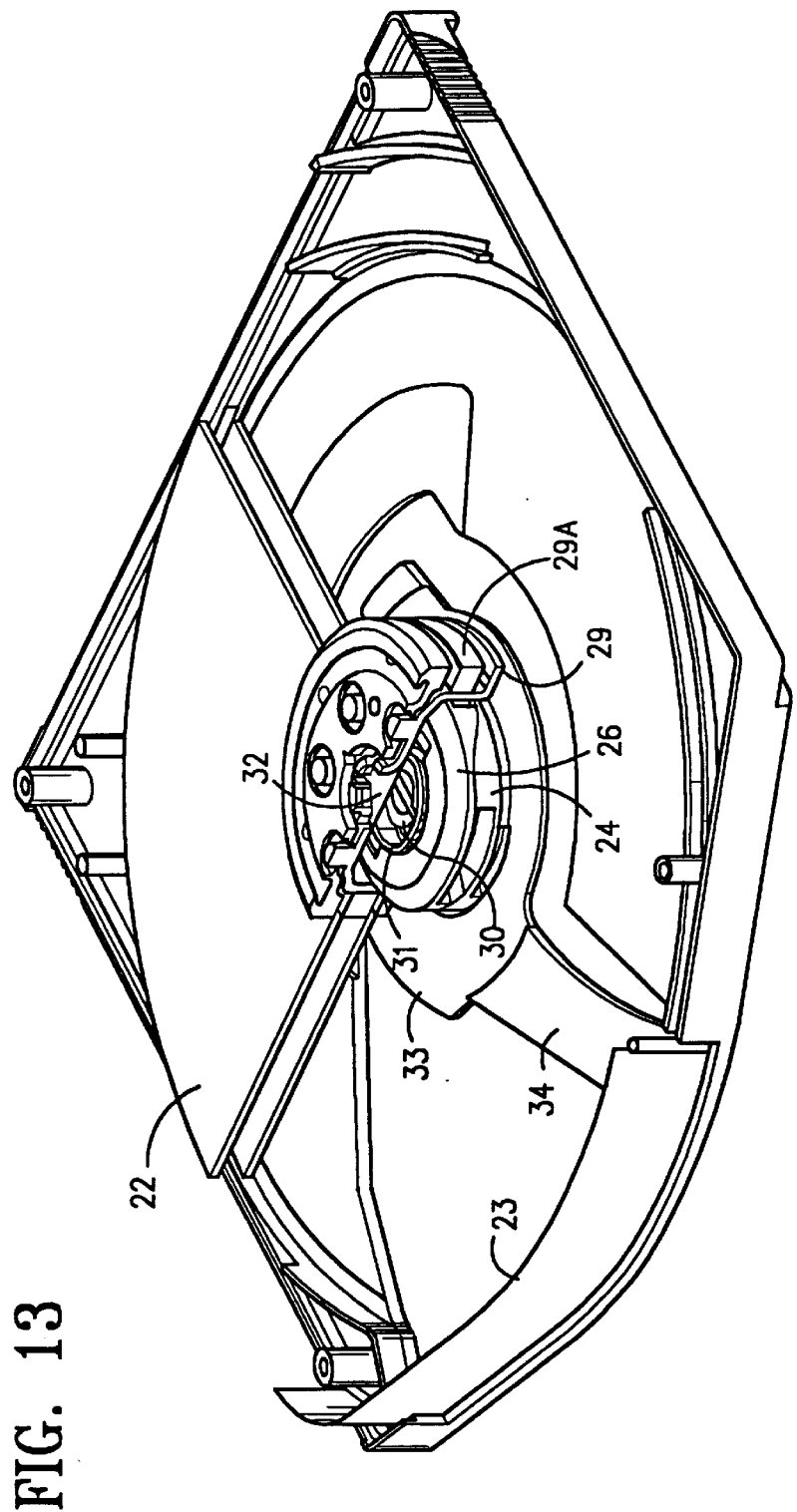
FIG. 13 is a broken away perspective view of a preferred embodiment of the invention with the door in the closed position.
Figure 14:
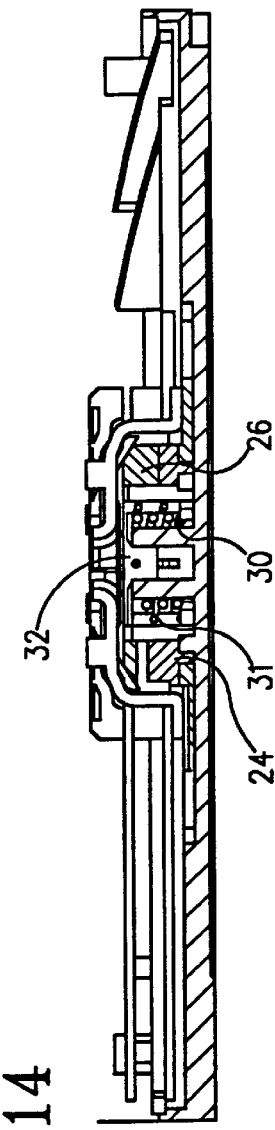
FIG. 14 is a cross-section of the cartridge of FIG. 13.

A retaining spring 30 is positioned co-axially with the hub 29. The retaining spring 30 applies torsion to the hub 29 to return it to the position shown in FIG. 3 after it has been translated by the cam follower 26. A compression spring 31 applies bias to the cam follower 26 to return it. A spring 31, which is concentric with, but outside of, the spring 30, provides return force for the cam follower 26 to bring it into its open position. The springs 30 and 31 are both shown in FIG. 11A. The cartridge has a cavity at the center thereof in which the clamping mechanism of the present invention is positioned. A hub cap 32 retains the springs in this cavity.

Figure 17:
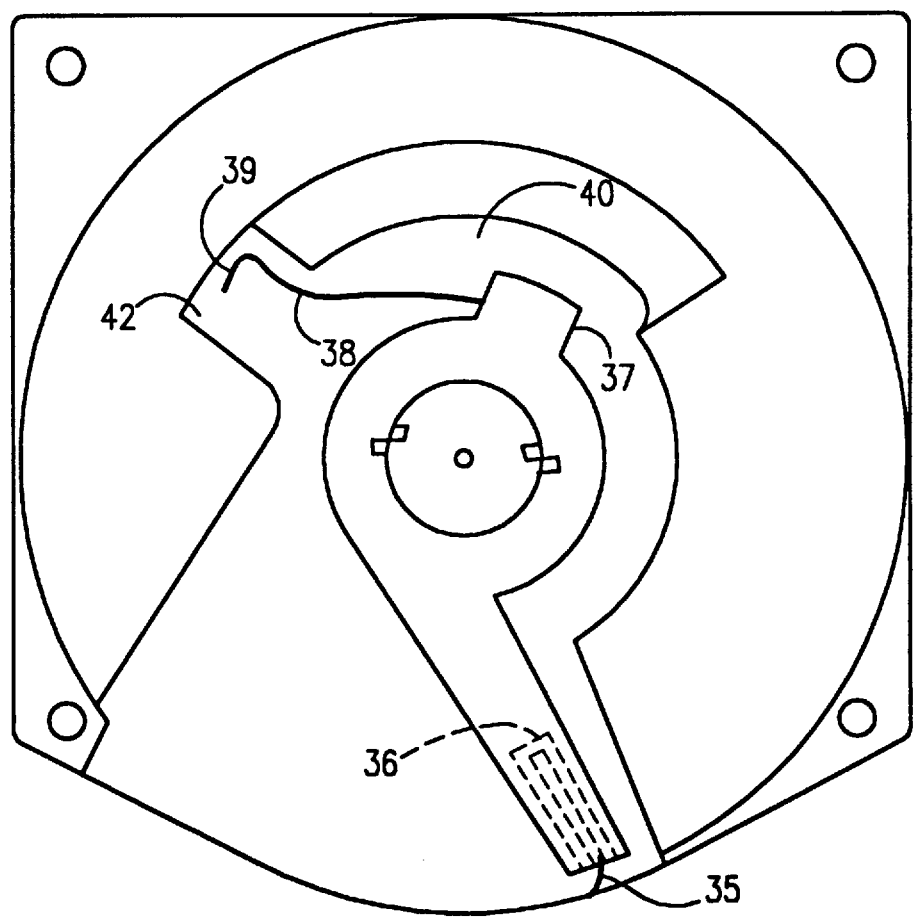
FIG. 17 is a top-plan view of the cartridge with the top shell and disks removed.

FIGS. 13–17 show a preferred embodiment of the invention in which the connection between the clamping mechanism and the door is a member 33 which is rotatable about the axis of the disks. Rotatable member 33 has an arm 34 extending radially toward the door 23. The terminal end of arm 34 is connected to the door by the wire 35. (FIGS. 16 and 17). Wire 35 is disposed in an opening 36 in the arm. The wire telescopes into and out of the opening 36 as the door travels through its stroke. This accommodates the varying radial distance to the door throughout its stroke.

A protrusion 37 on the arm has a spring 38 which provides the closing force needed to close the door through the last portion of its travel. The spring 38 has a bent end 39 which travels in the arcuate path 40. The arcuate path has a notch 41 at the closing end thereof. As the bent end 39 travels along arcuate path 40, it drops into the notch 41 at the closing end of the door stroke. This provides the extra force necessary to close the door.

Arcuate path 40 is a depression in the face of the cartridge. This depression has a cover 42 so that the spring 38, and its bent end 39 travel in a closed path.

Various modifications may be made to the preferred embodiment. The appended claims are, therefore, intended to cover all such modifications within the true spirit and scope of the invention.

What is claimed is:

1. A cartridge for a drive in which read/write heads read/record data on a recording medium comprising:
    a shell having a front, a back, and two sides between substantially flat, planar surfaces;
    said recording medium being in said shell and having a hub, said hub having a cavity at the center thereof;
    said shell having an opening in the front thereof for access by said read/write heads from outside of said shell to said recording medium;
    a door covering said opening when said cartridge is removed from said drive;
    a rotating cam rotatable on the same axis as said recording medium, said rotating cam having an inclined surface which extends axially along a circumference thereof, said rotating cam being operatively connected to said door such that said cam rotates about said axis as said door is opened and closed; and
    a cam follower disposed within the cavity of said hub,
    the inclined surface of said rotating cam engaging said cam follower and moving said cam follower axially upon rotation of said cam, whereby said cam follower is caused to press against said hub so as to press said hub against said shell when said door is closed.

2. The cartridge recited in claim 1 wherein said door has a stroke between the open and the closed positions thereof, wherein said cam is connected to said door by an actuating wire providing a spring coupling which allows for over-travel at both ends of said stroke of said door.

3. The cartridge recited in claim 2 wherein said door slides in tracks and wherein said spring coupling provides tolerance for relative changes in the distance between said cam and the point at which said actuating wire is attached to said door, as said door travels through its stroke.

4. The cartridge recited in claim 1 further comprising:
    a retaining spring positioned co-axially with said hub, said retaining spring applying bias to said hub to return it after it has been moved axially by said cam follower.

5. The cartridge recited in claim 1 wherein said cam is connected to said door by a member rotatable about the axis of said recording medium.

6. The cartridge recited in claim 5 wherein said member has an arm extending radially toward said door, terminal end of said arm being connected to said door.

7. The cartridge recited in claim 6 and further comprising:
    a wire connecting the terminal end of said arm to said door, said wire being disposed in an opening in the terminal end of said arm, said wire telescoping into and out of said opening as said door opens and closes.

8. The cartridge recited in claim 5 further comprising:
    a spring for returning said door to said closed position when said cartridge is removed from said drive.

9. The cartridge recited in claim 8, further comprising:
    an arcuate path for said spring, said spring having a bent end, said bent end traveling in said arcuate path as said door moves from the open to the closed position.

10. The cartridge recited in claim 9 further comprising:
a notch at the end of said arcuate path, said bent end of said spring traveling into said notch to provide the force to close said door through the last portion of travel of said door to its closed position.

11. The cartridge recited in claim 9 further comprising:
a cover for said arcuate path, said spring traveling in the covered arcuate path as said door moves between the open and the closed position.

12. The cartridge recited in claim 1, wherein the front of said shell has a convex portion that protrudes outwardly from the forward ends of the two sides.

13. The cartridge recited in claim 12, wherein the shape of said convex portion comprises a small radius curve adjacent the forward end of one of said sides of the shell, a large radius curve in the middle of said front, and a straight section between said small radius curve and said large radius curve.

14. The cartridge recited in claim 12 wherein said shell is symmetrical about a plane bisecting said shell at a midpoint between the two sides, and extending parallel to said sides and perpendicular to the substantially flat planar surfaces of said shell.

15. A cartridge for a drive in which read/write heads read/record data on a recording medium, comprising:

- a shell having a front, a back, and two sides between substantially planar surfaces, wherein the front of said shell has a convex portion that protrudes outwardly from forward ends of the two sides, and wherein said shell is symmetrical about a plane bisecting said shell at a midpoint between the two sides and extending parallel to said sides and perpendicular to the substantially planar surfaces of said shell;
- said recording medium being in said shell and having a hub, said hub having a cavity at the center thereof;
- said shell having an opening in the front thereof for access by said read/write heads from outside of said shell to said recording medium;
- a door, movable between an open position and a closed position, for covering said opening whenever said cartridge is removed from said drive;
- a rotating cam rotatable on the same axis as said recording medium, said rotating cam having an inclined surface which extends axially along a circumference thereof, said cam being connected to said door by a member rotatable about the axis of said recording medium, said member comprising an arm extending radially toward said door, wherein a terminal end of said arm is connected to said door, whereby said rotating cam rotates about said axis as said door is opened and closed;
- a cam follower disposed within the cavity of said hub, the inclined surface of said rotating cam engaging said cam follower and moving said cam follower axially upon rotation of said cam, whereby said cam follower is caused to press against said hub when said door is closed; and
- a means for returning said door to the closed position when said cartridge is removed from said drive;
- wherein said recording medium is held in a clamped position whenever said door is in said closed position.

* * * * *